UNITED STATES PATENT OFFICE.

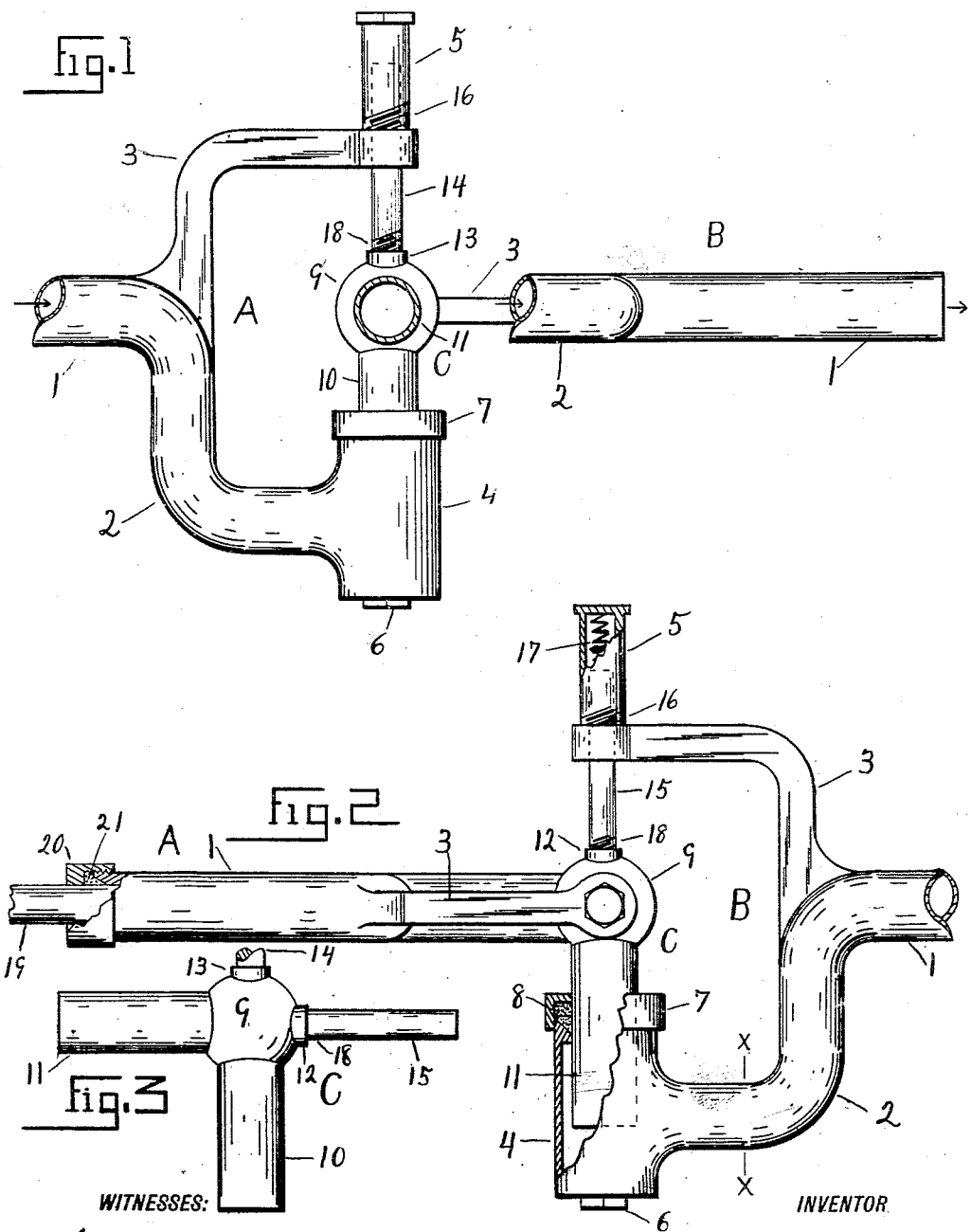

CHARLES G. SATER, OF JEFFERSONVILLE, INDIANA.

FLEXIBLE JOINT.

1,148,862.  Specification of Letters Patent.  Patented Aug. 3, 1915.

Application filed January 31, 1913. Serial No. 745,313.

*To all whom it may concern:*

Be it known that I, CHARLES G. SATER, a citizen of the United States, residing at the city of Jeffersonville, in the county of Clark and State of Indiana, have invented a certain new and useful Improvement in Flexible Joints, of which the following is a specification.

This invention relates to flexible joints to be interposed in conduits conveying fluid between containers located on different levels, or between containers the alinement of which is subject to change.

An object to be attained is the production of a joint that will accommodate itself to sudden changes in the alinement of the conduit in which it is connected, and that is more especially applicable to service between a locomotive boiler and the tank located on the tender.

A further object is to produce a flexible joint that will be economical in construction, efficient in service and easily maintained.

With these, and other objects, in view this invention consists of the novel arrangement of parts set forth, and illustrated in the accompanying drawing which forms a part of this specification, in which is set forth an embodiment of my invention, but it is to be understood that changes, variations and modifications may be resorted to that come within the scope of the claims appended hereunto.

In the drawings, in which like reference characters indicate like parts in the different views; Figure 1, is a side elevation, a portion being broken away on the line x—x of Fig. 2; Fig. 2 is plan, with parts in section; Fig. 3, a side elevation of the connecting member.

The invention consists essentially of two yoke shaped members —A— and —B— disposed at right angles to each other and retained in operative relationship by a connecting member —C—. The members A and B each comprise a stem —1— and arms —2— and —3—. The stem 1 and arm 2 form a continuous tubular construction and the arm 3 is of solid construction. On the end of the arm 2, and in communication therewith is disposed a cylindrical chamber —4— the axis of which is perpendicular to, and intersects the axis of the stem 1. Near the end of the arm 3 a tubular casing —5— is erected, the axis of the casing lying in a prolongation of that of the cylinder 4. These casings may be adapted to be secured in, or to, the arm 3 in any suitable manner, as by screw threads —16—. The outer end of the cylinder 4 is provided with a plug —6— to allow of ready access for cleansing purposes. The inner end of the cylinder is provided with a cap —7— and adapted for reception of a packing —8—. The connecting member —C— comprises a chamber —9— with which are connected tubular members, or pistons, —10— and —11— that are in communication with the interior of the chamber and project therefrom at right angles to each other. On the exterior of the chamber are disposed bosses —12— and —13—. To these bosses rods —14— and —15— are secured by suitable means such as screw threads —18—, the axis of the rods lying in a prolongation of the axis of the pistons 10 and 11. As assembled for service one of the pistons, as 10, fits in the cylinder of part A, the other piston 11 fitting in the cylinder of part B, the rods 14 and 15 entering the casings 5 of the parts A and B respectively. In the casings the rods are engaged by springs —17— that serve as cushions, or buffers, the tension of these springs may be adjusted by screwing the casings 5 in or out of the arms 3.

The operation of the device will readily be understood. Fluid, flowing from a container, in the direction of the arrow, will pass through the stem 1, down through the arm 2 into the cylinder 4 of part A thence up through the piston 10 into the chamber 9 thence through the piston 11 into the cylinder of part B thence out through the arm 2 and stem 1 of that part. It will be clearly seen that the part A is free to slide to and fro on the piston 10 and rod 14 and likewise to pivot on the same, and that the part B is free to likewise slide and pivot on the piston 11 and rod 15. In service the fluid flowing through the cylinders serves as a cushion, and the springs 17, in the casings 5, serve the same purpose protecting the parts A and B from undue shock at each end of their lateral movement. The yoke members A and B each having both a sliding and a pivotal motion on the intermediate member C provides for changes, in the alinement of the containers, vertically and laterally. But in some cases, as in the case of a locomotive and its tender, the containers will approach and recede, I provide for this contingency by adapting one, or both, of the stems 1 to receive a telescoping member —19—, a cap —20— and packing —21— serving to make a tight connection.

Having thus described my invention so that any one skilled in the art pertaining thereto may make and use the same, I claim:—

1. A joint comprising a pair of members each consisting of a stem having a pair of diverging arms, a cylinder disposed on the end of one and an adjustable casing on the end of the other of said arms, said cylinder and casing being in axial alinement, the stem and arm bearing the cylinder being provided with a passage opening into the cylinder, said members being disposed at right angles to each other with their stems in axial alinement, a connecting member comprising a central spherical chamber, a pair of tubes extending therefrom at right angles to each other, and entering the aforesaid cylinders, a pair of rods secured on the chamber and extending therefrom in axial alinement with said tubes, and entering said casings, springs in said casings adapted to normally maintain said rods at the outer limit of their movement, the arrangement being such that the members are free to reciprocate on the respective rods and tubes.

2. A joint comprising a pair of identical members, each comprising a stem and a pair of diverging arms, a cylinder disposed on the end of one and a tubular casing on the end of the other of said arms, said cylinder and casing being in axial alinement, and said axis intersecting the axis of the stem, the stem and arm bearing the cylinder provided with a passage opening into said cylinder, a connecting member comprising a central chamber, a pair of tubes extending therefrom and at right angles to each other with their axes intersecting, a pair of rods extending from said chamber and being in axial alinement with said tubes, said tubes and rods engaged respectively in the cylinders and casings of said identical members, said members having free reciprocal movement thereon.

3. Identical members each comprising a stem, a pair of diverging arms joined thereto, a cylinder disposed on the end of one and a tubular casing on the end of the other arm, said cylinder and casing being in axial alinement, and the axis thereof intersecting the axis of said stem, the stem and arm bearing the cylinder being provided with a passage opening into the cylinder, said members disposed at right angles, with said stems in axial alinement and the axis of the cylinders intersecting, an intermediate member, arms extending therefrom and entering said cylinders and casings, having free reciprocal movement therein, the arms entering the cylinders being tubular and affording communication therebetween.

4. A joint comprising a pair of identical members, each comprising a stem with diverging arms, a cylinder disposed on the end of one and a tubular casing on the end of the other of said arms, said cylinder and casing being in axial alinement, the stem and arm bearing the cylinder being provided with a passage opening into the cylinder, said members being disposed at right angles with the stems thereof in axial alinement, a connecting member comprising a central chamber, a pair of tubes extending therefrom and at right angles to each other, a pair of rods connected to said chamber and extending therefrom in axial alinement with said tubes, the axes of said tubes and rods intersecting, said tubes and rods entering and have reciprocous motion in said cylinders and casings respectively and a spring in each of said casings adapted to normally maintain said rods at the outer limit of their travel.

CHARLES G. SATER.

Witnesses:
F. H. KAPPA,
W. B. MUNNELL.

Copies of this patent may be obtained for five cents each, by addressing the "Commissioner of Patents, Washington, D. C."